United States Patent [19]
Burghardt et al.

[11] Patent Number: 5,721,416
[45] Date of Patent: Feb. 24, 1998

[54] OPTICS FOR FORMING A SHARP ILLUMINATING LINE OF A LASER BEAM

[75] Inventors: Berthold Burghardt, Waake; Hans-Jürgen Kahlert, Göttingen, both of Germany

[73] Assignee: MicroLas Lasersystem GmbH, Göttingen, Germany

[21] Appl. No.: 653,047

[22] Filed: May 28, 1996

[30] Foreign Application Priority Data

Jun. 1, 1995 [DE] Germany .................. 195 20 187.6

[51] Int. Cl.⁶ .................. B23K 26/06; G02B 13/08; G02B 27/09
[52] U.S. Cl. .................. 219/121.73
[58] Field of Search .................. 219/121.73, 121.75, 219/121.77; 359/723

[56] References Cited

U.S. PATENT DOCUMENTS

| | | | |
|---|---|---|---|
| 4,744,615 | 5/1988 | Fan et al. | 219/121.77 |
| 4,911,711 | 3/1990 | Telfair et al. | 219/121.75 |
| 5,237,149 | 8/1993 | Macken | 219/121.73 |
| 5,296,673 | 3/1994 | Smith | 219/121.75 |
| 5,331,466 | 7/1994 | Van Saarloos | 359/723 |
| 5,414,559 | 5/1995 | Burghardt et al. | 359/623 |
| 5,601,733 | 2/1997 | Partlo | 219/121.73 |
| 5,609,780 | 3/1997 | Freedenberg et al. | 219/121.73 |

FOREIGN PATENT DOCUMENTS

| | | |
|---|---|---|
| 0100242 | 7/1983 | European Pat. Off. . |
| 0232037 | 1/1987 | European Pat. Off. . |
| 3829728 | 9/1988 | Germany . |
| 3841045 | 12/1988 | Germany . |
| 4220705 | 6/1992 | Germany . |
| 07027993 | 7/1993 | Japan . |

*Primary Examiner*—Geoffrey S. Evans
*Attorney, Agent, or Firm*—Brumbaugh, Graves, Donohue & Raymond

[57] ABSTRACT

An optical device is described for generating a sharp illuminating line on an illuminating plane from a high-power laser beam. The sharp illuminating line includes long and short axes. The optical device comprises an anamorphic setup of imaging and homogenizing optical systems for the separate imaging and homogenizing of the laser beam in the directions of the long and short axes. For imaging and homogenizing the laser beam in the direction of the short axes, a slit is illuminated homogeneously and the slit is imaged on the illumination plane by reducing optics.

2 Claims, 3 Drawing Sheets

Beam Path "Short Axis"

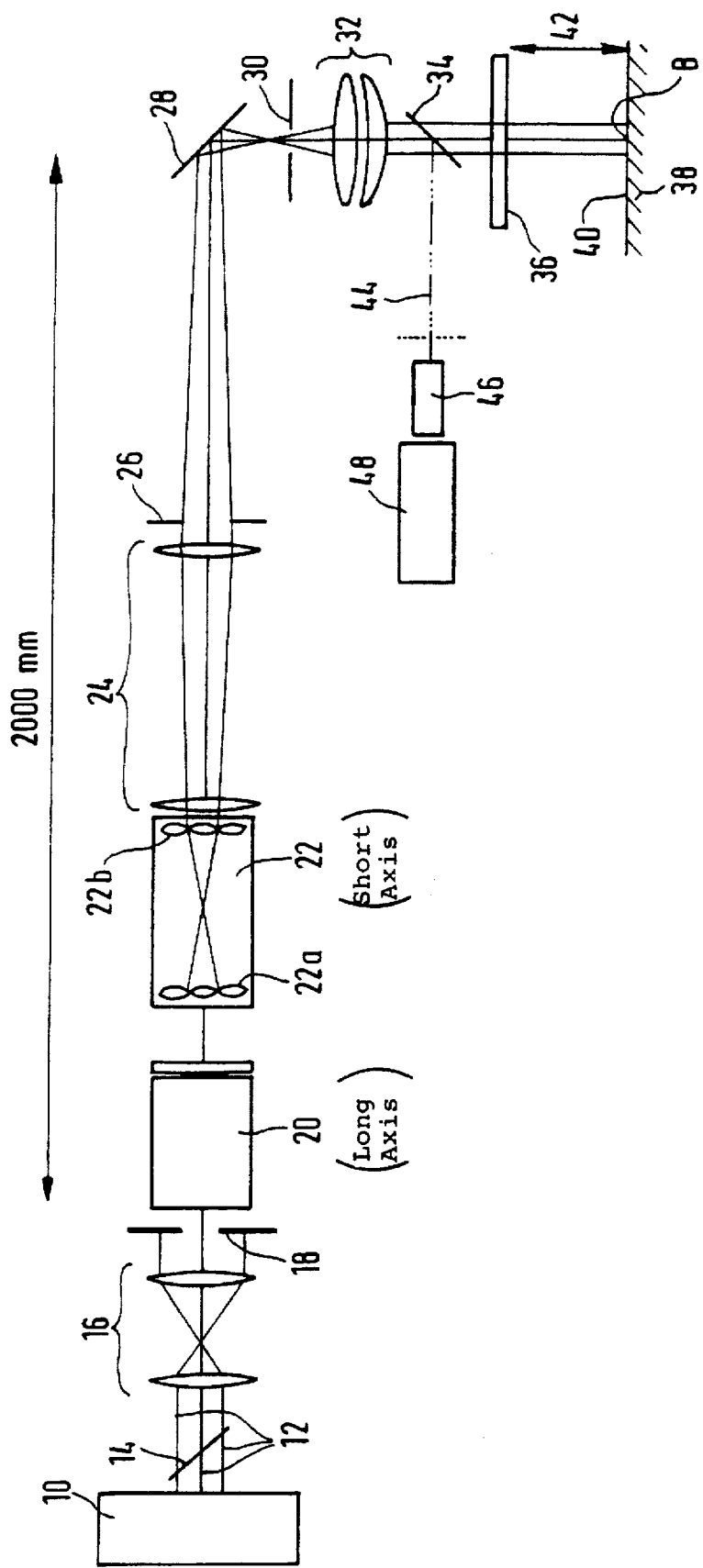
FIG. 1a   Beam Path "Short Axis"

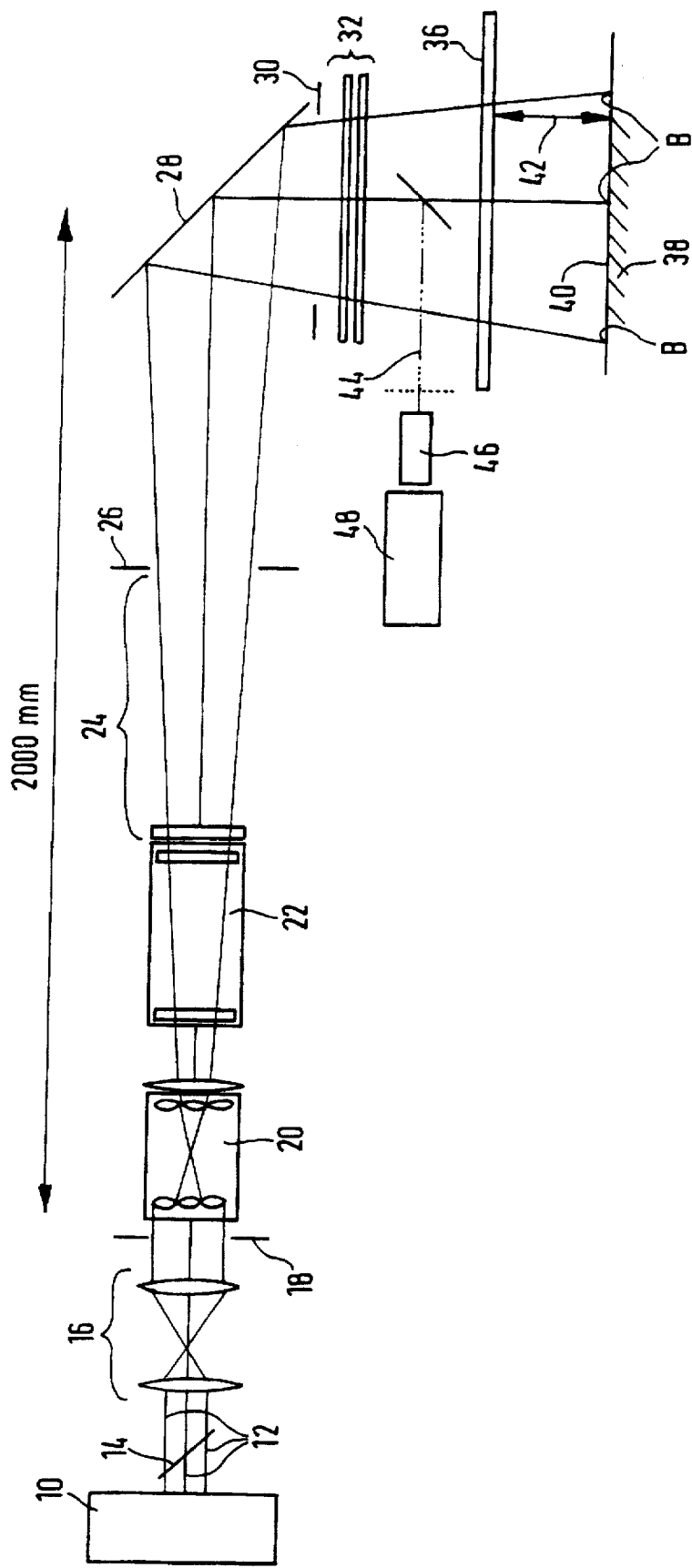
FIG.1b  Beam Path "Long Axis"

OPTICS FOR FORMING A SHARP ILLUMINATING LINE OF A LASER BEAM

The instant invention relates to an optical device for forming a sharp illuminating line, including long and short axes, of a laser beam emitted by a high-intensity laser, such as an excimer laser, by means of an anamorphic setup of imaging and homogenizing optical systems for the separate imaging and homogenizing of the laser beam in the direction of the long and short axes.

BACKGROUND OF THE INVENTION

An anamorphic image is an optical image of which the imaging scale or image size differs in two sections (directions) which are at right angles to each other. Optical devices of the kind mentioned above and comprising anamorphic systems are known from EP 0 232 037 A1, JP 07027993 A, and EP 0 100 242 A2.

Excimer lasers emit high intensity coherent ultraviolet radiation and are applied especially in the fields of industrial manufacture, medicine, and research. Radiation sources of this type are used also in X-ray lithography.

For a great number of applications the laser beam emitted by the excimer laser must be processed optically.

As a rule, the (essentially untreated) laser beam as emitted by the excimer laser does not have a uniform distribution of intensity throughout its cross section. With many lasers, for example, the intensity distribution may be described by a bell curve which is rotationally symmetric with respect to the direction of propagation. Transversal gas discharge lasers, such as the excimer laser, although not displaying any disturbing intensity peaks across the beam profile, nevertheless must be homogenized in order to provide homogeneous illumination of a surface to be worked on.

A device for homogenizing particularly excimer laser beams is described in DE-A-42 20 705. The same device is specified in U.S. Pat. No. 5,414,559. In the description below, this prior art is assumed to be known and the teaching disclosed in those publications is included expressly in the instant application.

The dimensions of a laser beam emitted by an excimer laser typically are some 10 by 30 mm. Certain applications require that this beam be processed in such a way as to yield the narrowest possible, sharp illuminating line which, moreover, is homogeneous in intensity distribution. Illumination lines of this nature are used, for instance, when excimer lasers are applied for the recrystallization of amorphous Si-layers to produce flat display screens. Illuminating lines having lengths of several hundred millimeters and typical widths of 0.05 mm to 1 mm are advantageously applied under these circumstances.

An anamorphic homogenizing optical system with which the wave-guide element provided would have to be made very narrow and also very wide in order to be able to produce a long, sharp line is described in the above mentioned JP 07027993 A. EP 0 232 037, likewise cited above, describes an anamorphic image obtained by applying the so-called zooming principle. Also EP 0 100 242 A2 shows anamorphic homogenization, however, just like the other prior publications mentioned, without any homogeneous illumination of a slit. Besides, this prior art is concerned with diode lasers.

SUMMARY OF THE INVENTION

It is the object of the instant invention to provide an optical device of the kind specified initially which permits creating illumination lines having a high aspect ratio (length divided by width of the line), the best possible homogeneous energy distribution within the line, sharp definition along the edges of the illuminating line, and great depth of field. At the same time, maximum (loss free) utilization is to be made of the radiation emitted by the laser.

The optical device according to the invention devised to meet the above object is characterized by an anamorphic setup of imaging and homogenizing optical systems for separately imaging and homogenizing the laser beam in the direction of the long and short axes. For imaging and homogenizing the laser beam in the direction of the short axis, a slit is illuminated homogeneously and the slit is imaged on the illumination plane by means of an optical system.

An anamorphic image is an optical image, specifically a non-centered one, of which the imaging scale or the image size differs in two sections which are perpendicular to each other. Here, the two mutually perpendicular sections lie in the direction of the long and short axes, respectively, of the elongated illuminating line. In other words, anamorphic separation of the image and homogenization of the laser beam in these two mutually perpendicular directions is provided.

In a preferred modification of the invention the laser beam is not imaged on the slit mentioned, in respect of the long axis of the illuminating line. Instead, it is imaged directly on the illumination plane, i.e. the plane in which the illuminating line is to be formed on a substrate which is to be subjected to processing.

According to another preferred modification, the imaging optical system which images the above mentioned slit in reduced form (in the direction of the short axis) is telecentric at the image side. An optical system is telecentric if, for each image point, it provides a principal ray parallel to the optical axis. In the case of an optical system which is telecentric at the image side the exit pupil is located at an infinite distance.

BRIEF DESCRIPTION OF THE DRAWINGS

The invention will be described further, by way of example, with reference to the accompanying drawings, in which:

FIGS. 1a, 1b are diagrammatic presentations of an optical device according to the invention for producing a sharp illuminating line, FIG. 1a illustrating the beam path for generating the so-called short beam axis and FIG. 1b the beam path for generating the long beam axis of the illuminating line;

DETAILED DESCRIPTION OF THE INVENTION

Figure 2:
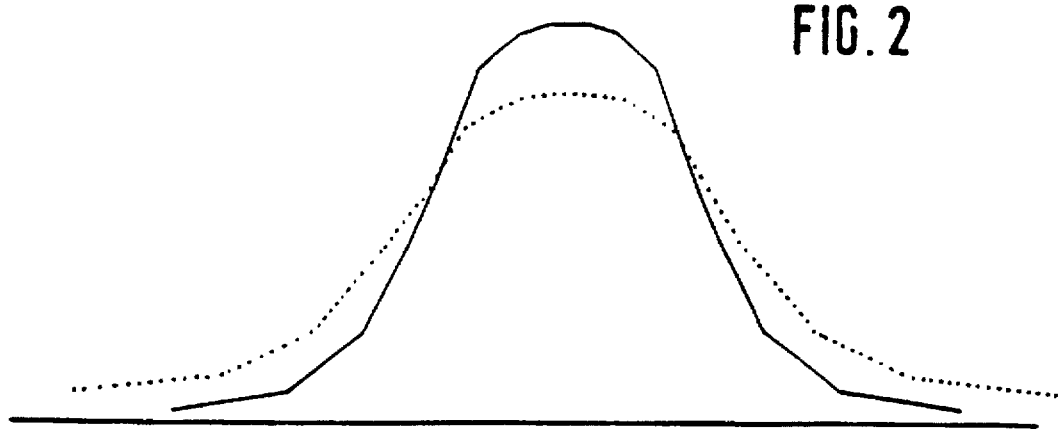
FIG. 2 is a cut through the intensity distribution of an illuminating line according to the prior art.

The optical arrangement illustrated in FIGS. 1a and 1b comprises an excimer laser 10 which emits a pulsed beam 12 in per se known manner. The dimensions of the excimer laser beam 12 emitted, for instance, may be 15×40 mm. This laser beam now is to be processed by means of the optics which will be specified below to yield an illuminating line B (lower right hand part in FIGS. 1a, 1b).

The optical system according to FIGS. 1a, 1b, on the whole, is an anamorphic system in the sense that the processing of the laser beam 12 in the directions of the long and short axes, respectively, takes place largely independently. This is demonstrated in the respective FIGS. 1a and 1b.

The beam 12 emitted by the excimer laser 10 first passes an attenuator 14, if desired, and then enters an anamorphic cylindrical lens telescope 16. By means of this cylindrical lens telescope 16 the beam is adjusted to the dimensions of the entrance aperture 18 of the optics next down the line. Here, the near field of the excimer laser 10 is transmitted to the vicinity of entrance apertures (not shown), to be described in greater detail below, of homogenizing optics 20, 22. The homogenizing optics 20, 22 preferably correspond to the homogenizing optical systems described in the above mentioned DE-A-42 20 705 and U.S. Pat. No. 5,414,559, respectively. Other suitable homogenizing optics are specified in DE 38 29 728 A1 and DE 38 41 045 A1, yet they are less preferred.

The homogenization of the laser beam likewise is effected anamorphically.

To obtain the so-called short axis of the illuminating line (i.e. to reduce the beam diameter to the width of the illuminating line of, typically, 0.05 to 1 mm), first of all, as shown in FIG. 1a, a slit 26 is illuminated homogeneously with the aid of the homogenizing optical system 22 and a field lens 24. In this context it is particularly significant that the slit 26 be illuminated homogeneously in efficient manner (i.e. making the best possible use of the radiation energy supplied by the laser). When applying the homogenizing optics according to the above mentioned U.S. Pat. No. 5,414,559, i.e. according to the art specifically included in the instant disclosure by this reference, the first row of lenses specified in that publication (the so-called illumination array 22a, in other words the lenses located at the light entry side) are disposed at a distance f (2) from the so-called imaging array 22b (i.e. the imaging lens facing the image), this distance f (2) being the focal length of the imaging lens. In this manner, optimum edge definition of the illumination field is obtained in the plane of the slit 26.

In the further course of forming the short axis $A_s$ of the illuminating line B the slit 26 is imaged on a substrate 38 in the illumination plane 40 by means of a reducing cylindrical lens system 32. As shown in the drawing, the beam is deflected at a mirror 28 and enters the entry pupil 30 of the reducing optical system 32 prior to reaching the optical system itself.

As a result of this reducing imaging in the illumination plane 40 achieved by means of the reducing optics 32, the illuminating line B is defined in terms of sharpness (edge definition) by the imaging characteristics of the optical system 32. The optical system 32 is employed (like a lens) so that a reduced image of the slit 26 is obtained, e.g. at a ratio of 5:1. Optical systems of this kind permit edge definitions down to a few μm to be achieved, depending on the optical resolution (NA) of the reducing optics. A sharp edge definition is accompanied by excellent depth of field. Thus an edge definition of 20 μm and a depth of field of typically +/− 200 μm are obtainable for an NA of illumination of 0.1 on the image side.

In the embodiment shown, the optical system 32 for imaging the slit 26 on the plane 40 in which the illuminating line B is to be created is telecentric at the side facing the image, in other words the main beam is directed vertically to the plane 40 of the substrate 38 to be worked on. The field lens 24 and the illumination pupil 30 may be arranged in such a way that the energy densities on the deflection mirrors and also on the other surfaces of the optical elements are kept so low that surface areas will not be altered by the high-energy laser light so that, consequently, a long service life is warranted (1000 million pulses and more).

The arrangement shown of the optical elements in respect of the creation of the short axis, furthermore, permits very great working distances to be maintained from the substrate 38 being processed which, in many cases, must be located in a vacuum chamber (not shown). A window 36 of a vacuum chamber is indicated schematically in FIGS. 1a, 1b. The spacings between the reducing optics 32 and the window 36, on the one hand, and between the window 36 and the substrate 38, on the other hand, may be kept rather great (10 to 20 cm and greater). Thus there is room for a partly transparent mirror 34 to branch off a partial beam 44 (a few per cent) which then will be imaged by a microscope lens 46 on a solid body image converter 48 to monitor the beam profile.

The long illuminating axis $A_1$ is obtained, as shown in FIG. 1b, by means of the homogenizing optical system 20 which again preferably is designed according to DE 42 20 705 A1 or U.S. Pat. No. 5,414,559. The image plane of the image obtained by the homogenizing optical system 20 lies in the image plane of the optical system 32 which produces a reduced image of the slit 26 on the plane 40 of the illuminating line B, in other words the surface of the substrate 38 to be worked on. Imaging by the homogenizing optical system 20 is effected at a 30- to 40-fold magnification, for example, so as to provide great depth of field and good homogeneity of the radiation energy distribution.

Figure 3:
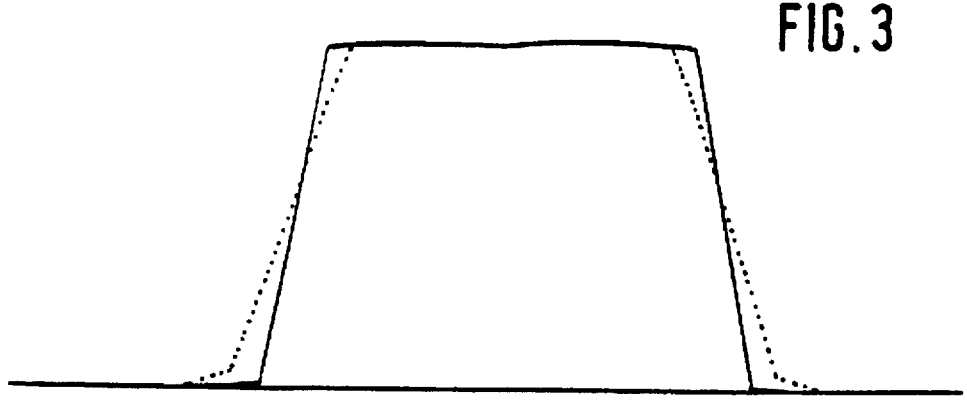
FIG. 3 is a cut through the intensity distribution of an illuminating line obtained according to the invention.
Figure 4:
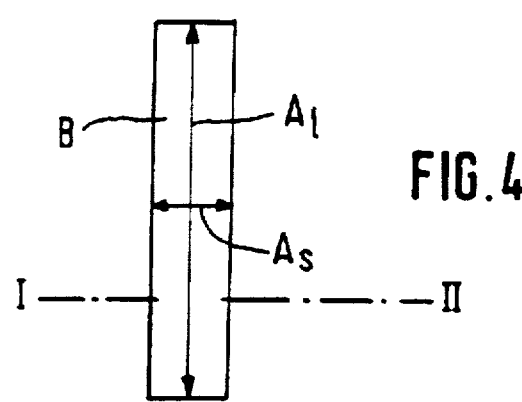
FIG. 4 is a diagrammatic presentation of an illuminating line, as seen from the top, for explaining the dimensions and axes of interest.

FIGS. 2 and 3 illustrate the result achieved by means of the optical system described above, namely an illuminating line B having a very high aspect ratio (great length, small width) with extremely sharp edges. FIG. 4 illustrates the designations and dimensions used with regard to the illuminating line B. FIG. 4 is to be understood merely as illustrative and by no means true to scale. The long axis $A_1$ of the illuminating line corresponds to the length thereof, and the short axis $A_s$ to the width thereof. FIG. 3 depicts a cut taken along line I–II in FIG. 4 and demonstrates that a highly precise edge definition of the intensity distribution as well as extremely good homogenization of the radiation energy distribution throughout the cross section are obtained, as compared with the state of the art illustrated in FIG. 2. For example, an edge definition of a mere 20 μm is achieved, in other words the radiation intensity goes from practically zero to the full value over a distance of less than 20 μm (FIG. 3).

The optical system described above has the further advantage that the imaging scale does not depend substantially on the position of the substrate 38 to be processed, but instead only the contrast of the frame edges. The energy density within the illuminating line is essentially constant as long as the width does not get into the order of magnitude of the resolution.

What is claimed is:

1. An optical device for generating a sharp illuminating line on an illumination plane, said illuminating line having a high aspect ratio and being generated from a laser beam emitted by a high power laser and having a cross-section with long and short axes, said optical device comprising:

an anamorphic setup of imaging and homogenizing optical systems for the separate imaging and homogenizing of said laser beam in the directions of said long and short axes;

a slit illuminated by said homogenized laser beam, and reducing optics for reducing the homogenized beam from said slit in the direction of the short axis and imaging said reduced beam on said illumination plane.

2. The optical device according to claim 1, wherein said reducing optics imaging the homgenized beam from said slit in reduced form in the direction of said short axis is telecentric at the side facing the image.

* * * * *